Nov. 21, 1961 M. J. LUCKEY 3,009,786
APPARATUS FOR DETERMINING ALCOHOL CONTENT OF GASES
Filed Aug. 13, 1959 2 Sheets-Sheet 1
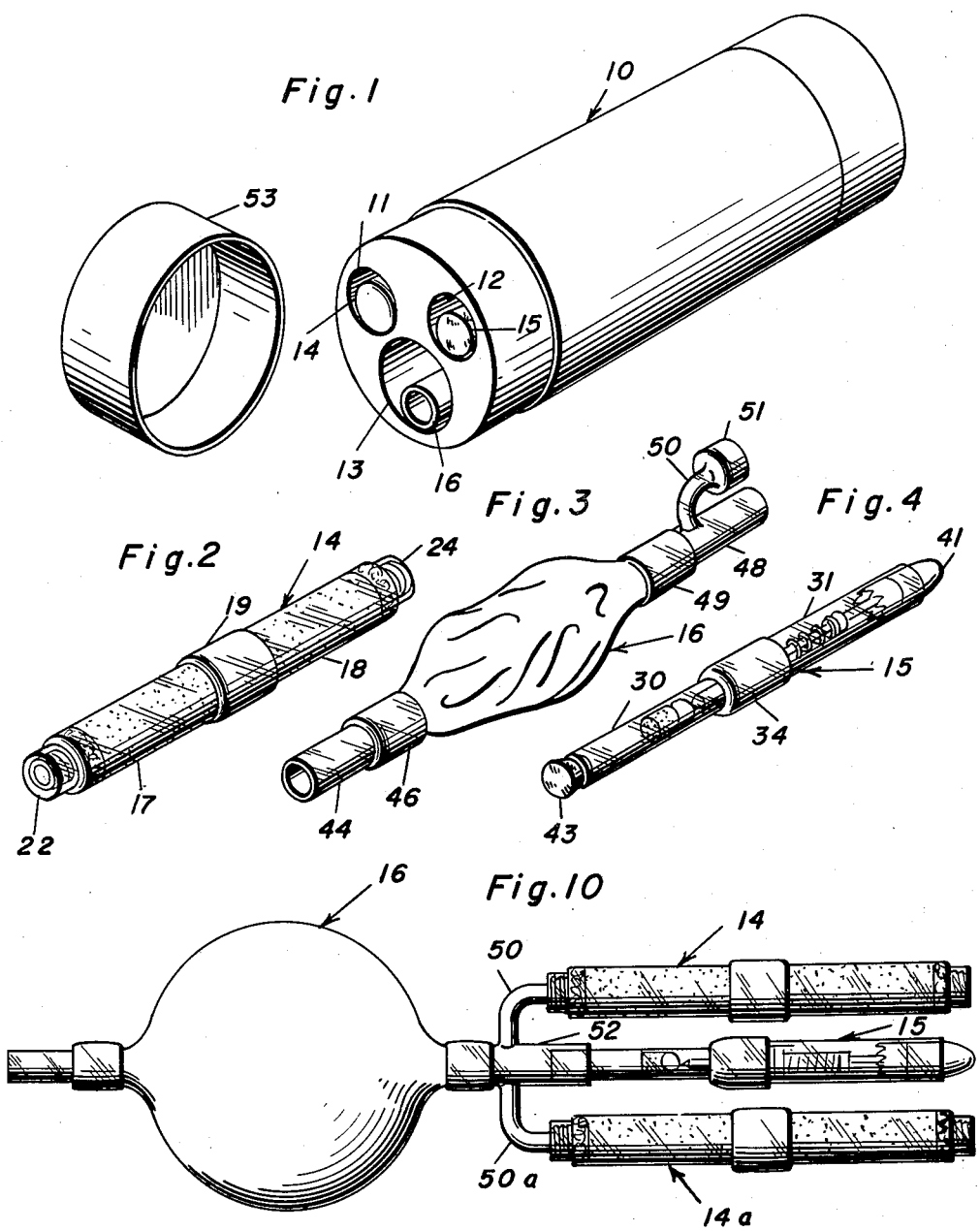
Manley J. Luckey
INVENTOR.

Nov. 21, 1961 M. J. LUCKEY 3,009,786
APPARATUS FOR DETERMINING ALCOHOL CONTENT OF GASES
Filed Aug. 13, 1959 2 Sheets-Sheet 2
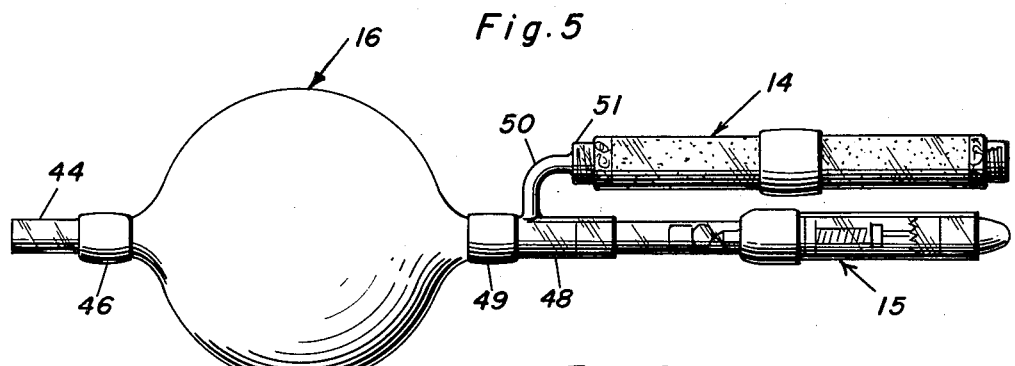
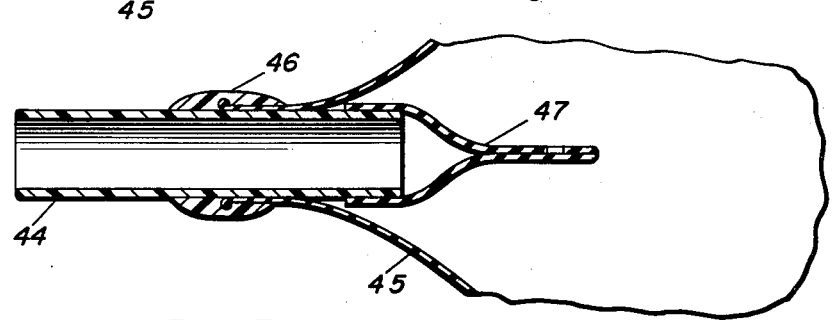
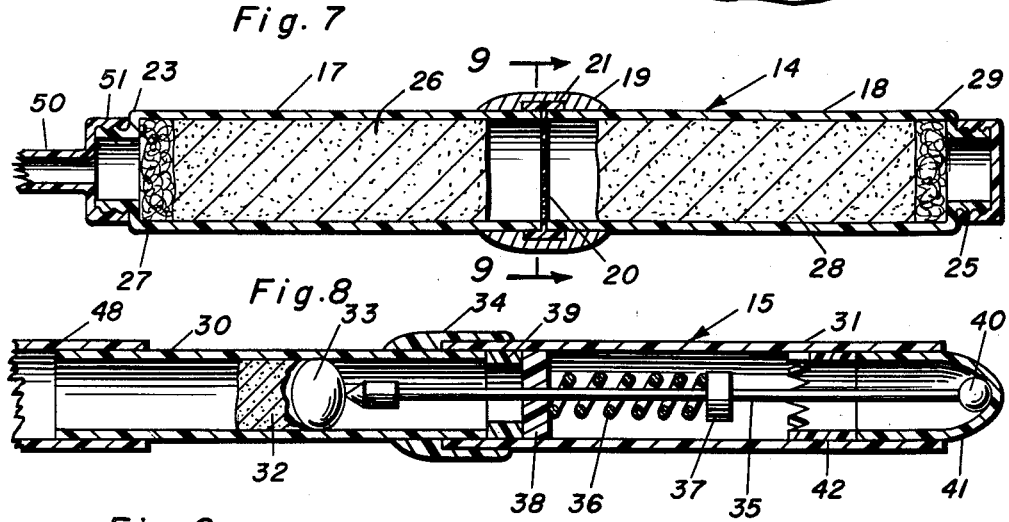
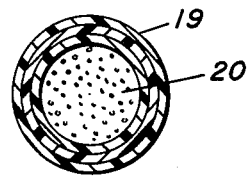
Manley J. Luckey
INVENTOR.

United States Patent Office 3,009,786
Patented Nov. 21, 1961

3,009,786
APPARATUS FOR DETERMINING ALCOHOL
CONTENT OF GASES
Manley J. Luckey, 1295 "E" St., San Bernardino, Calif.
Filed Aug. 13, 1959, Ser. No. 833,472
4 Claims. (Cl. 23—254)

This invention relates generally to an apparatus for measuring alcohol content of gases, and more particularly it relates to an apparatus for measuring the alcohol content of the human breath and thereby through the use of a suitable equation determine the amount of alcohol in an individual's blood.

In recent years there has been a noteworthy increase in the number of automobile accidents throughout the country. Many of these automobile accidents may be directly attributed to the intoxicated state of the drivers thereof. Legal officers in charge of traffic control are constantly vigilant against the inebriated driver. A driver found to be intoxicated while operating an automobile is usually charged with reckless driving. Furthermore, a driver who is intoxicated and has been in an automobile accident is often charged with the guilt of the accident. It will be appreciated, therefore, that the usual determination concerning a driver as to his condition of sobriety cannot be left to the opinion of the legal officers investigating the case. The old standby of smelling a person's breath or of making him walk a straight line is not an accurate scientific analysis which can be used evidentially in a court of law. Modern scientific methods have shown us that these antiquated methods of determining sobriety give a wide range of view of an individual's condition. For instance, a person by suitable aromatic lozengers may be able to mask alcoholic breath odor. Also, the mere walking of a straight line successfully does not indicate in any way whether the individual has impaired reflex action which would prevent him from operating an automobile safely.

A number of methods have been proposed to obviate many of the disadvantages in the gross determination of a person's sobriety. One well known method is to remove a portion of a person's blood and therefrom accurately determine the level of the blood alcohol content. In such a determination a quantitative degree of the amount of alcohol per milliliter of blood has been determined so that a quantity above this level in a person's blood is considered to produce intoxication. This method while noteworthy for its extreme accuracy is unsuitable for on the road determinations. It is evident that few police officers can accurately remove specimens of blood from an individual that is about to be investigated. Furthermore, many states regard the removal of a blood specimen as an invasion of constitutional rights and consequently prohibit such a removal without the specific consent of the individual concerned. In any event the individual must of necessity be transported to a place where a qualified technician or doctor may remove a blood sample. This blood sample is then transported to a laboratory where the test is made. Another method which has found some favor recently concerns the analysis of the breath of the person being investigated. It is a known fact that a person who has been imbibing alcoholic beverages contributes a certain amount of alcohol in a vaporous state through his breath. Scientific analysis has been able to correlate the amount of alcohol in a person's breath with the amount of alcohol in that same person's blood and has determined, therefrom, a proportional factor. It will become obvious, therefore, that by taking a quantitative amount of a person's breath and then analyzing it for its alcoholic content, if any, the amount of alcohol in a person's blood may be readily determined, therefrom, by employing the proportional factor. The taking of a person's breath is of course a much easier method than attempting to remove a sample of blood. One such method is to have the person blow up a balloon, which, when fully inflated has a known volume of breath. This breath from the balloon is then expelled through suitable absorbing apparatus from which a determination may be made as to its alcoholic content. Another method is for the person under investigation to breathe directly through an apparatus. Chemicals therein absorb the alcohol from the breath and sometimes the carbon dioxide constituent. By determining the amount of carbon dioxide the amount of total breath exhaled through the device may be determined. Additionally, the amount of alcohol can be determined from the absorbing chemicals. It is essential in any breath type determination that the total volume of breath be known before the amount of alcohol can be determined in the blood stream. The prior art devices and methods for employing the individual's breath for alcohol content determination falls short in providing easily manipulative quantitative determination of the total volume of breath and falls short in setting up a suitable absorbing device which may be highly portable and have extremely long shelf life.

It is therefore a primary object of the present invention to provide a method and apparatus for determining the alcohol content of an individual's breath.

It is another object of the present invention to provide an ingenious portable kit which may be used in capturing a quantitative amount of a person's breath in order to determine the alcohol content thereof.

It is yet another object of the present invention to provide an apparatus for determining the alcohol content in a person's breath which comprises a number of interchangeable parts so that the device before it can be put into operation may be confined in a relatively small space.

These together with other objects and advantages will become subsequently apparent in the details of construction and operation as more fully hereafter described and claimed, reference being had to the accompanying drawings forming a part hereof, wherein like numerals refer to like parts throughout, and in which:

FIGURE 1 is a perspective view of the complete apparatus as packed into a cylindrical tube with the cover being removed from the tube;

FIGURE 2 is a perspective view of an absorbent containing tube;

FIGURE 3 is a perspective view of the balloon assembly;

FIGURE 4 is a perspective view of the frit tube;

FIGURE 5 is a side elevation of the balloon assembly with the balloon in partial inflation and the frit tube and absorbent tube in position;

FIGURE 6 is a view in cross-section of the valve arrangement in the balloon assembly;

FIGURE 7 is a longitudinal cross-sectional view of the absorbent tube;

FIGURE 8 is a longitudinal cross-sectional view of the frit tube;

FIGURE 9 is a transverse vertical sectional view taken substantially upon the plane indicated by the section line 9—9 of FIGURE 8 and shows the specific details of the perforated diaphragm;

FIGURE 10 is a side elevational view showing another embodiment of the apparatus of the present invention employing a plurality of absorbent tubes.

Referring now to the drawings, and in particular to FIGURE 1, it shows the disassembled apparatus of the present invention suitably positioned in a cylindrical tube 10. The interior of the tube is compartmented into three longitudinal compartments 11, 12 and 13, respectively. The three components of the apparatus are seen to be positioned therein. Compartment 11 contains absorbent tube 14. Compartment 12 contains frit tube 15. Compartment 13 contains the inflatable or balloon assembly 16. Cover 53 is employed to fit snugly over tube 10. By providing a compartmented tube of the nature described, the individual components may be mailed and may be transported without danger that the units will become broken or contaminated in any way.

Now, turning to a discussion of the absorbent tube employed in the present invention, particularly shown by FIGURES 2, 7 and 9, it will be seen that the tube is composed of two separate units 17 and 18. The tubes may be constructed of transparent material, preferably a plastic material in order to prevent breakage. A suitable material that may be employed is polyethylene. The tubes 17 and 18 are joined by connector portion 19 which is a plastic annular collar which joins the two ends of tubes 17 and 18. For greater detail, specific attention is directed to FIGURES 7 and 9. Situated between tubes 17 and 18 and covering the ends thereof is a perforated diaphragm. Diaphragm 20 has mounted along its periphery extending flanges 21 for engagement with the outer periphery of tubes 17 and 18. The other end of tube 17 is stoppered with closure 22 which is screwed on threaded portions 23. The other end of tube 18 has a similar closure 24 which is screwed on threaded portion 25. The interior of the tube 17 contains a quantity of magnesium perchlorate 26 in granular form. The material is kept in place by glass wool plug 27 at one end. The other tube 18 contains a quantity of carbon dioxide absorbing material such as "Ascarite 28" which is Arthur H. Thomas and Company's tradename for sodium hydroxide on an asbestos carrier. This material is also positioned away from the opening of the tube 18 by glass wool plug 29.

Attention is now directed to FIGURES 4 and 8 for a detailed description of the frit tube of the present invention. The frit tube assembly 15 consists of glass tube 30, plastic tube 31 which has a slightly larger bore so that it fits snugly over one end of glass tube 30. Positioned interiorly of glass tube 30 is a small wad of fritted powdered glass 32. This fritted glass wad is fused in the glass tube by means of heat. The wad 32 is soaked with a small quantity of sulphuric acid. Directly associated on one side of the wad is a capsule 33 containing a quantity of potassium permanganate. The glass tube and the plastic tube 31 are jointed together by plastic annular collar 34. Plastic tube 31 contains a needle tipped plunger 35 which extends its needle portion into glass tube 30 abutting its needle against capsule 33. Spring 36 is mounted concentrically on the rod portion of plunger 35 and biases it away from capsule 33. The spring 36 is positioned between washer 37 mounted on the rod portion of plunger 35 and washer 38 mounted in the plastic tube 31, abutting on one side against annular ring 39. Annular ring 39 abuts at its opposite side against the end portion of glass tube 30. The opposite end of plunger 35 ends in a padded arrangement 40. The end of plastic tube 31 and padded arrangement 40 is capped by plastic cap 41 which has a diameter to permit a snug fit interiorly of plastic tube 31. Annular ring 42 is wedged inside plastic tube 31 and a short distance from the end thereof. It is positioned in such a way that it acts as a stop means for preventing it being pushed into tube 31 and against padded portion 40. It will be appreciated that this arrangement prevents plunger 35 from being pushed against capsule 33 until cap 41 is removed from tube 31. The other end of glass tube 30 is closed by stopper 43 as shown in FIGURE 4.

Attention is now directed to FIGURES 3 and 6 for a detailed description of the balloon assembly 16. Balloon assembly 16 has a tube-like mouthpiece 44 at one end thereof. A tubular inflatable rubber material 45 has one end secured over mouthpiece 44 by means of annular ring 46. FIGURE 6 shows that the end of the mouthpiece jutting into the inflatable tube 45 has a flutter valve 47 to prevent the escape of breath back through the mouthpiece. The other end of tubular rubber material 45 is positioned on distributor 48 by means of collar 49. Distributor 48 is an open ended tube having a by-pass conduit arrangement 50 which ends in an interiorly threaded portion 51 which is capable of accepting threaded portion 23 of absorbent tube 14. The other end portion of distributor 48 has a diameter suitable for frictional joint with the glass tube 30 as shown in FIGURE 8.

In practice, the three units are removed from tube 10 and assembled. This is accomplished by removing caps 22 and 24 from tube 14. Tube 14 is then screwed into end portion 51 by means of threaded portion 23. Stopper 43 is removed from frit tube 15. The frit tube is then connected to distributor 48 by slipping a portion of the glass tube 30 into the open end of distributor 48 to establish a snug fit. Breath is then blown into the assembly through mouthpiece 44. It will be appreciated that the air passes through the balloon assembly through by-pass arrangement 50 and 51 into tube 14. This is continued for a period of three to four minutes in order to get a prepresentative example for analysis. The alcohol is absorbed on the magnesium perchlorate 26 and the carbon dioxide is absorbed by the "Ascarite." When this portion of the test is completed cap 24 is replaced on absorbent tube 14. Then, in order to activate the frit tube, cap 41 is removed, therefrom, and plunger 35 is pushed inwardly breaking capsule 33, thereby distributing the potassium permanganate solution contained therein over the glass frit wad 32. Breathing is then continued and the length of time it takes to decolorize the glass wad is determined. In this maner a gross determination can be made of the sobriety of the individual undergoing the test. In other words, by putting a particular quantity of acid and potassium permanganate together on the wad a relationship may be established so that a rough estimate may be garnered therefrom as to the alcohol content of the person's breath. This is employed in conjunction with the more accurate determination conducted in a laboratory in determining the amount of alcohol absorbed by the magnesium perchlorate. By way of example the frit wad is loaded with from .06 to .10 cubic centimeter of 1.1 to 1.3 specific gravity sulfuric acid. The capsule 33 contains a solution of between .05 to .10 cubic centimeter potassium permanganate having a concentration of .005 to .001 normal. If the purple color of the potassium permanganate disappears in forty seconds or less of breathing through the frit tube, the individual would be under the influence of alcohol. If it takes between forty to fifty-five seconds of breathing therethrough, the individual is only probably under the influence. If it takes between fifty-five and eighty seconds there is only a possibility, and if longer, then the person is not under the influence of alcohol.

In order to get a more accurate determination the absorbent tube is capped at both ends and then taken to the laboratory for analysis. The magnesium perchlorate is measured for alcohol content by well known and conventional methods. One of such methods comprises dissolving the magnesium perchlorate in water. The liquid is distilled and the distillate is then quantitatively measured by standard chemical means for ethyl alcohol concentration. The Ascarite is measured for carbon dioxide concentration by weighing and then determining the difference between the weight after the test and prior thereto. Since it is known that the expelled breath of an individual contains approximately 5.5% carbon dioxide, the quantitative determination of the amount of carbon dioxide in the Ascarite may be employed in the quantitative determination of the amount of breath which has been passed through absorbent tube 14. It is seen, therefore, that the ratio of alcohol to carbon dioxide by weight in the breath from the individual under investigation may then be readily computed. Since this is proportional to the alcohol concentration in the blood, it is apparent that one may be computed from the other. A convenient relationship for determining the percentage of alcohol in the blood from the alcohol to carbon dioxide ratio is as follows:

Percent of alcohol in the blood = 0.2 $\times \dfrac{\text{grams of alcohol}}{\text{grams of carbon dioxide}}$ Attention is now directed to FIGURE 10 which shows another embodiment of the present invention. Distributor 52 has two by-pass arrangements 50 and 50A. Each by-pass arrangement carries an absorbent tube 14 and 14A. In order to ensure accuracy of the test, first one tube 14 may be employed and then a second tube 14A may be employed while 14 is recapped. In this manner, by averaging the alcohol content shown by the two tubes a more accurate analysis results.

From the foregoing the construction and operation of the device and method for its use will be readily understood and further explanation is believed to be unnecessary. However, since numerous modifications and changes will readily occur to those skilled in the art, it is not desired to limit the invention to the exact construction shown nor to the method detailed, and accordingly all suitable modifications and equivalents of the apparatus and method may be resorted to fully within the scope of the invention as claimed.

What is claimed as new is as follows:

1. In an apparatus for determining the degree of intoxication of a person, including an absorbent tube having one end connected to breath distributing means, said tube having near the said end thereof a wad of absorbent material containing sulphuric acid, a capsule of potassium permanganate positioned at the side of the wad away from the end communicating with the distributing means, longitudinally movable plunger means mounted at that end of said tube for breaking the capsule, said plunger means extending longitudinally beyond the end of the tube for manipulation thereof, spring means interconnecting the plunger means and the tube for urging the plunger means away from the capsule, and a cap arrangement closing this end of said tube.

2. In an apparatus for determining the degree of intoxication of a person, including an absorbent tube having one end connected to breath distributing means, said tube having near the said end thereof a wad of absorbent material containing sulphuric acid, a capsule of potassium permanganate positioned at the side of the wad away from the end communicating with the distributing means, longitudinally positioned plunger means mounted at that end of said tube for breaking the capsule, one end of said plunger means abutting the capsule, the other end extending beyond the end of said tube, a cap arrangement closing this end of said tube.

3. In an apparatus for determining the degree of intoxication of a person, including an absorbent tube having one end connected to breath distributing means, said tube having near the said end thereof a wad of absorbent material containing sulphuric acid, a capsule of potassium permanganate positioned at the side of the wad away from the end communicating with the distributing means, longitudinally positioned plunger means mounted at that end of said tube for breaking the capsule, one end of said plunger means abutting the capsule, the other end extending beyond the end of said tube, the plunger means having a collar intermediate its ends, said tube having a fixed annular member positioned between said collar and said capsule, a spring positioned between said collar and said fixed annular member for urging said plunger means away from the capsule, a cap arrangement encompassing the end portion of the plunger means extending beyond the tube and closing the end of the tube.

4. In an apparatus for determining the degree of intoxication of a person, including an absorbent tube having one end connected to breath distributing means, said tube having near the said end thereof a wad of absorbent material containing sulphuric acid, a capsule of potassium permanganate positioned at the side of the wad away from the end communicating with the distributing means, longitudinally positioned plunger means mounted at that end of said tube for breaking the capsule, one end of said plunger means abutting the capsule, the other end extending beyond the end of said tube, the plunger means having a collar intermediate its ends, said tube having a first fixed annular member positioned between said collar and said capsule, a spring positioned between said collar and said fixed annular member for urging said plunger means away from the capsule, a second fixed annular member positioned in said tube near the end opposite to the end connected to the breath distributing means, a cap arrangement encompassing the end portion of the plunger means extending beyond the tube and closing the end of the tube and adapted to have its open end portion in abutment with the second annular member.

References Cited in the file of this patent
UNITED STATES PATENTS

| | | |
|---|---|---|
| 2,591,691 | Forrester | Apr. 8, 1952 |

FOREIGN PATENTS

| | | |
|---|---|---|
| 713,377 | Germany | Nov. 6, 1941 |
| 713,378 | Germany | Nov. 6, 1941 |